Patented May 15, 1928.

1,669,661

UNITED STATES PATENT OFFICE.

J BIRCHARD GREEN, OF CHICAGO, ILLINOIS.

COATED FILLER MATERIAL.

No Drawing.  Application filed February 28, 1927. Serial No. 171,734.

This application is a continuation in part of application, Serial No. 96,064 filed March 19, 1926.

My invention relates to welding electrodes and other filler material used in fusion welding and cutting by the arc process, and it has special relation to the coatings of such materials provided in order to improve the welding and cutting operations. Among the objects of the invention is an electrode or filler material having a novel coating characterized by a greater degree of uniformity than the prior art coatings, while retaining the advantages of the best coatings used heretofore and which is also less expensive and easier to manufacture. A distinct feature of the invention is a process of manufacturing the novel electrodes.

The demand for a filler material or an electrode that will secure uniform welding and arc conditions, notwithstanding the fact that the individual skill of the operator must be depended upon to carry out such operations, is becoming more and more acute. It was with a view to secure such uniformity that it has been suggested to apply to the surface of the welding electrodes or other filler material various kinds of coatings. The function of the coatings was to produce in proximity to the arc a condition, which will make said arc substantially independent of changes in the factors, which ordinarily determine the character of an arc, such as the variations of the electrode distance, the chemical activity of the oxygen and nitrogen in the surrounding air, etc.

There are four distinct types of coating which have been proposed, and to a limited extent used with a view to eliminating the difficulties met in the welding operations, namely (a) slag coatings, (b) full flux coatings, (c) residual lubricant coatings and (d) inappreciable coatings.

The slag coatings have the form of a relatively thick layer of a coating material around a metal core which constitutes the filler proper. The coating material is applied to the surface of the filler material in the form of a paste or a very thick liquid. This coating constitutes an appreciable part of the total material of the electrode. While the coating contributes to the protection of the arc against changes due to the surrounding conditions, it fails in the very essence of the purpose for which it was intended, because of the admixture of a large part of the material of the coating in the form of a slag in the deposited weld metal.

The full flux coatings aim at the elimination of the slag incident to the use of the thick slag coatings and may consist of a layer of coating material applied to the filler rod by dipping it in a thick viscous coating solution. The reason for using a very thick dipping solution is to obtain a coating as thick as possible without as much objectionable slag formation as in the case of the slag coating described above. In these coatings it is still the purpose to produce a coating appreciable in thickness as compared to the thickness of the core of the electrode. Because of the viscous character of the coating solution it is impossible to secure a high degree of uniformity in the thickness of the coating, and the uniformity that has been obtained with the commercial product could be secured only by individually drying the dipped welding rods while standing separately on end. As far as I am aware it was never possible to obtain the practicable welding rods having such coatings by drying the dipped rods or electrodes "en masse," but individual handling of each rod was necessary during the dipping and drying operations.

Residual lubricant coatings are very thin coatings and consist merely of the remainder of the lubricant left upon the wire or rod after it has been passed through the drawing tools, while being reduced in thickness. The lubricant material usually contains lime or iron oxide and it is applied to the hot rolled wire-rod immediately after pickling to remove the scale, the wire-rod then being passed through a series of dies until it is reduced to the desired diameter. The residual quantity of lubricant left on the surface of the wire or rod is affected by every slight change in the character of the wire surface, the temper of the wire, the condition of the drawing dies, and the subsequent machine operations of straightening and cutting. Moreover, the effective coating material is scattered unevenly over the surface. There is also the objection that only materials which constitute adequate wire lubricants can be used.

Inappreciable coatings consist of merely a trace of material, or a layer of minute thickness of the coating material. The welding rod so coated is still essentially a bare electrode. In this type of coating the elimination of the slag is secured by the sacrifice of the effectiveness of the coating. The character of the resulting weld appears to be the same as if a bare electrode was used. The main objection against this type of coating is the complete absence of uniformity in working characteristics, to secure which coatings were originally intended. One of the principal reasons for the lack of uniformity, is in using this type of electrodes the protective action of the "coating" is obtained from materials which are adsorbed by the surface of the filler rather than that material which is present actually constituting a distinct layer thereon. Since the adsorptive qualities of the filler surface vary widely over the same piece of filler material and also between the different pieces of material, it is obvious that the uniformity aimed at is not being realized. In practice it has, as far as I know, been impossible to secure even a limited amount of uniformity in operating with such an inappreciable filler coating.

The coating of this invention distinguishes radically from all of the foregoing types, in that it is highly uniform in appearance and character over the entire surface of the filler material, and secures a high degree of uniformity both as to the operating characteristics and quality of the resultant work along the length of the same filler rod and between different filler rods. This is effected by making the layer on the surface of the electrode of considerably greater thickness than that of the inappreciable or residual lubricant coatings, but on the other hand considerably thinner than in the full flux and slag coatings. In other words, it has been found that between the regions of relatively thick coatings and very thin coatings, each of which by its nature makes it difficult to secure uniformity of coating thickness there is a range wherein coatings of substantial thickness can be obtained which at the same time are characterized by a surprisingly high degree of uniformity in the layer in which they form on the filler surface.

The appreciable coating of this invention is obtained by dipping the welding rods or other filler materials in a relatively thin dipping or coating solution as contrasted to the thick viscous liquids or pastes used in preparing the full flux or slag coatings. When using such thin dipping or coating solutions, it is possible to cheapen and expedite the process of manufacture by dipping and drying the electrodes "en masse" without loss of uniformity in the coating or resulting working characteristics.

The preferred coating is characterized as being one of maximum thickness which can be applied by dipping and drying the pieces of filler material "en masse", and at the same time give a uniformity of coating which will result in a high degree of uniformity both as to operating characteristics and quality of the resultant work both as to the same rod and as between rods. This coating is obtained by dipping the filler material in a thin flowing coating liquid or solution, which is of sufficient consistency to give an appreciable coating, but which is of insufficient consistency to give a thickness of coating which will result in a non-uniform appearance of the coating when the material is dried "en masse". It is also within this invention to use coating or dipping solutions of lesser consistency which will give coatings of less than the maximum thickness specified above. But as the resultant coating approaches one of the inappreciable type the uniformity in working characteristics is lessened.

In the case of two element coating or dipping baths or solutions, that is where the bath or solution is composed of a viscous adhesive material such as glue, dextrin, sodium silicate, soap, etc., and one or more relatively nonviscous weld assisting materials such as suspended calcium carbonate or other metallic salts, the consistency of the bath is principally due to the viscous binder. Two element coatings of this character are necessary when the weld assisting material will not stick permanently upon the surface of the electrode or other filler material in sufficient quantities to form an appreciable or very effective coating as is the case with calcium carbonate and many other inorganic compounds. To obtain the preferred coating, which is the maximum coating which can be obtained and which will allow the rods to be dried "en masse", as much of the viscous binder such as sodium silicate is added as possible without producing a thick coating solution, and then this solution or dip is loaded with as much calcium carbonate or other weld assisting material as it will hold without producing a dull irregular surface appearance on the dried rods. If thinner dips are desired less binder, such as sodium silicate, can be used, and this in turn will produce a thinner and less preferred coating.

In the case of some weld assisting materials the weld assisting material can act as its own binder and in these cases sufficient weld assisting material is placed in the bath to give it the proper consistency, so that the maximum coating will be obtained while permitting the rods to be dried "en masse," at the same time obtaining a high degree of uniformity. Other weld assisting materials will increase the consistency of the bath and in the case of such materials less of the viscous binder should be used. Usually weld assisting materials have little binding action and binding material has little weld assisting action, but where the weld assisting material has more or less binding action and where the binding material has more or less weld assisting action, appropriate adjustment can be made in the proportions of each used in the coating or dipping bath, so as to obtain the desired consistency and coating.

As most coatings in practice are applied to metallic arc welding electrodes, these shall be used as an example in describing the detailed practice of the invention. Wires, bars, metallic strips, etc. may also be used as filler material.

Among the coating solutions which may be used for surfacing electrodes by this process is one of the following composition: calcium carbonate 17 lbs., silicate of soda 40° Baumé 3 lbs., water 2 gallons, green mineral dyestuff in small quantity as a distinguishing color.

This was applied to iron and ferrous alloy electrodes, straightened and cut mostly to 14" lengths and mostly from 1/8" to 5/16" diameter inclusive. The coating mixture was placed in a suitable tank and about 50 pounds of electrodes were placed in a sling made of bar steel, dipped in the coating mixture, which was thoroughly stirred before each such lot was dipped, and the electrodes then held above the tank a few moments to allow the surplus liquid to drain off and finally dumped so as to scatter them in a mass over a nearby table top. A blast of warm air was continually blown over this table top and the electrodes dried quickly with a uniform appearing and a uniformly effective coating.

The following is the composition of two other dipping solutions which also can be used:

|  | 1 | 2 |
|---|---|---|
|  | Lbs. | Lbs. |
| Calcium carbonate | 150 | 150 |
| Sodium bicarbonate | 75 | 125 |
| Dextrine | 46 | 46 |
| Water | 198½ | 223 |
| Volatile green dyestuff in small quantity as a distinguishing color. | | |

These surfacing operations have been practiced both by hand and by machinery. By using this method of coating a more stable arc, better penetration and a slightly better slag on the weld surface was obtained without sacrificing any other desirable characteristics of the full flux coating. While the slag from all of my coatings contains the coating ingredients to some extent, still all of them so completely volatilize in the heat of the arc because of the small quantities present that a more desirable slag is found than has hitherto been possible with full flux coatings.

This coating greatly simplifies and cheapens the manufacturing process by eliminating the complicated dipping and drying operations used hitherto in producing full flux coatings. One of the advantages of the coating over the full flux coating resides in a reduction of cost of manufacture as a result of simplification, due to dipping and drying en masse, without a commensurate reduction in effectiveness.

The process is preferably applied to surfacing electrodes in the form of bars, rods or pieces of wire as a final manufacturing operation after straightening and cutting. It is very difficult to obtain a uniform coating when the wire is dipped in the coating solution in the form of a coil and then straightened and cut.

This coating is not to be confused with those coatings which are applied by means of a spray or brush. The preferred coating of this invention is the heaviest possible coating which may be applied as a final manufacturing operation by dipping and drying the electrodes "en masse" and which will still maintain uniformity of appearance and operating characteristics.

The expression "thin coating solution" used in the claims covers the range of relatively thin coating solutions which can be used in the practice of this invention.

The preferred coating of this invention is colored green by a volatile dyestuff, which will therefore not materially affect the arc.

What I claim is:

1. The method of uniformly, evenly and appreciably coating welding rods and other filler materials which comprises dipping the welding rods and filler material in a thin coating solution en masse, and then drying such dipped material en masse, said thin dipping solution containing a weld assisting material and having about the consistency of a solution of sodium silicate containing about 3 lbs. of the 40° Bé. silicate in about 2 gallons of water.

2. The method of uniformly, evenly and appreciably coating welding rods and other filler materials which comprises dipping the welding rods and filler material in a thin coating solution en masse, and then drying such dipped material en masse, said thin dipping solution containing a weld assisting material and having about the consistency of 46 lbs. of dextrine in about 200 lbs. of water.

3. Welding rods and other filler material with uniform and even appreciable coatings produced by drying upon the rods a layer of a dipping solution produced by dipping the same en masse in a solution containing about 150 lbs. of calcium carbonate, about 75 to 125 lbs. of sodium bicarbonate, about 46 lbs. of dextrine, and about 198 to 223 lbs. of water.

4. Welding rods and other filler material with uniform and even appreciable coatings produced by drying upon the rods a layer of a dipping solution produced by dipping the same en masse in a solution containing about 17 lbs. of calcium carbonate, about 3 lbs. of 40° Bé. sodium silicate and 2 gallons of water.

5. The method of uniformly, evenly and appreciably coating welding rods of metallic materials which comprises dipping the welding rods in a thin coating solution containing a binder and a weld assisting material in suspension and then drying such dipped rods en masse, said thin dipping solution being of such consistency as to spread uniformly and evenly over the rods and produce upon drying a thin coating of the weld assisting material of appreciable thickness which is of sufficient thickness to overcome irregularities in the absorptive power of the surface of the metallic material, which is substantially the maximum which can be applied by dipping and drying en masse and which is not sufficient in thickness to give rise to objectionable quantities of a slag in the weld.

6. Welding rods of a metallic material having a thin weld assisting surface coating thereon, said coating containing a binder and a uniformly and evenly distributed weld assisting material and consisting of a dried layer of a solution of the binder containing the weld assisting material in suspension of such consistency as to spread and dry evenly and uniformly over the rod when such rods are dipped and dried en masse the amount of such weld assisting material uniformly distributed over the rod being sufficient to minimize irregularities in the weld assisting properties of the surface of the metallic material itself but insufficient to give rise to enough non-metallic material in the arc to form objectionable quantities of slag.

In testimony whereof I have hereunto subscribed my name.

J BIRCHARD GREEN.